(12) United States Patent
Yoshikawa et al.

(10) Patent No.: US 8,882,960 B2
(45) Date of Patent: Nov. 11, 2014

(54) SUBSTRATE TREATING APPARATUS AND SUBSTRATE TREATING METHOD

(75) Inventors: Norio Yoshikawa, Kyoto (JP); Kazuo Jodai, Kyoto (JP); Yukio Tomifuji, Kyoto (JP); Shigeki Minami, Kyoto (JP); Kazuto Ozaki, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 0 days.

(21) Appl. No.: 13/450,028

(22) Filed: Apr. 18, 2012

(65) Prior Publication Data
US 2012/0273463 A1    Nov. 1, 2012

(30) Foreign Application Priority Data

Apr. 27, 2011  (JP) .................................. 2011-98886
Feb. 10, 2012  (JP) .................................. 2012-26836

(51) Int. Cl.
*B44C 1/22*    (2006.01)
*C23F 1/08*    (2006.01)
*C03C 15/00*   (2006.01)

(52) U.S. Cl.
CPC .............. *C03C 15/00* (2013.01); *Y10S 134/902* (2013.01)
USPC .............. 156/345.11; 156/345.2; 156/345.23; 156/345.24; 156/345.54; 156/345.15; 134/48; 134/902; 65/529; 65/165; 65/182.1

(58) Field of Classification Search
USPC ............. 156/345.11, 345.15, 345.23, 345.24, 156/345.54, 345.18, 345.55; 134/902, 48, 134/70, 76, 165, 82, 157, 83, 149, 125, 126
See application file for complete search history.

(56) References Cited

U.S. PATENT DOCUMENTS

| | | | |
|---|---|---|---|
| 6,625,835 B1 * | 9/2003 | Frost et al. ........................ | 15/77 |
| 6,804,851 B2 * | 10/2004 | Fehr et al. ........................ | 15/77 |
| 6,933,234 B2 * | 8/2005 | Nakamura et al. ............. | 438/690 |
| 2012/0273463 A1 * | 11/2012 | Yoshikawa et al. ............. | 216/92 |

FOREIGN PATENT DOCUMENTS

| | | |
|---|---|---|
| JP | 07-19767 B2 | 3/1995 |
| JP | 7-211684 | 8/1995 |
| JP | 10-223593 A | 8/1998 |
| JP | 2010-114448 | 5/2010 |
| TW | 201023266 A1 | 6/2010 |

* cited by examiner

*Primary Examiner* — Sylvia R MacArthur
(74) *Attorney, Agent, or Firm* — Ostrolenk Faber LLP

(57) ABSTRACT

An etchant is stored in a treating tank; a glass substrate is transported with transport rollers into the treating tank; the etchant is discharged from below the substrate to raise the substrate to a position above the transport rollers and below the surface of the etchant; the discharge of the etching liquid is stopped and the glass substrate is lowered to a position for contacting the transport rollers; the etchant is drained from the treating tank; and the glass substrate is unloaded with the transport rollers out of the treating tank. The disclosed method and apparatus can treat both front and back surfaces of the substrate uniformly.

11 Claims, 15 Drawing Sheets

SUBSTRATE TREATING APPARATUS AND SUBSTRATE TREATING METHOD

BACKGROUND OF THE INVENTION

1. Field of the Invention

This invention relates to a substrate treating apparatus and substrate treating method for treating, with a processing or treating liquid, rectangular substrates such as glass substrates for FPD's (flat panel displays), e.g., LCD's (liquid crystal displays) and PDP's (plasma display panels), glass substrates for organic electroluminescence (EL), glass substrates for photomasks, substrates for solar cell panels, substrates for optical disks or printed circuit boards, and the like.

2. Description of the Related Art

A substrate treating apparatus for treating substrates with an etchant is constructed to etch the substrates by supplying the etchant to front surfaces of the substrates while horizontally transporting the substrates supported at back surfaces by transport rollers.

In the conventional substrate treating apparatus which transports a substrate supported at the back surface thereof by transport rollers, the etchant supplied to the substrate will drift around to the back surface of the substrate and seep between the surfaces of the transport rollers and the back surface of the substrates. In such a case, the etchant having seeped between the surfaces of the transport rollers and the back surface of the substrate moves as the substrate is moved by rotation of the transport rollers. This etchant will remain in streaks on the back surface of the substrate.

When this substrate treating step is an etching step for etching silicon oxide film formed on the surface of a glass substrate with fluoric acid, for example, there will arise a problem that the back surface of the substrate is etched by the etchant as the treating liquid remaining in streaks as noted above. Such a phenomenon causes etching unevenness on the back surface of the glass substrate, which makes it impossible to etch both the front and back surfaces of the substrate uniformly. This poses a serious problem particularly when treatment is carried out by moving the substrate back and forth for a fixed period of time by means of transport rollers in a treating chamber.

Japanese Unexamined Patent Publication H7-211684 discloses a substrate cleaning apparatus which immerses a wafer in a tilted state in a cleaning liquid having formed therein ascending currents caused by overflows, and applies megasonic vibration to the cleaning liquid from a lateral direction of the wafer. However, this substrate cleaning apparatus, which is intended to prevent cross contamination of the cleaning tank and the substrate, cannot meet the need to transport and process or treat a large-size substrate.

SUMMARY OF THE INVENTION

The object of this invention, therefore, is to provide a substrate treating apparatus and substrate treating method capable of treating both front and back surfaces of a substrate uniformly.

The above object is fulfilled, according to this invention, by a substrate treating apparatus for immersing and treating a rectangular substrate in a treating liquid, comprising: a treating tank for treating the substrate; transport rollers arranged in the treating tank for horizontally transporting the substrate; a supplying device for supplying the treating liquid into the treating tank from a storage tank storing the treating liquid; and a draining device for draining the treating liquid from the treating tank to the storage tank; a liquid level adjusting mechanism varying a level of the treating liquid in the treating tank between a position above an upper surface of the substrate transported by the transport rollers and a position below a lower surface of the substrate transported by the transport rollers; and a treating liquid discharge device for discharging the treating liquid from below the transport rollers, with the substrate immersed in the treating liquid stored in the treating tank, thereby to raise the substrate to a position above the transport rollers. Such substrate treating apparatus is capable of preventing unevenness of treatment occurring on the back surface of the substrate, to treat both front and back surfaces of the substrate uniformly.

In one preferred embodiment, the substrate treating apparatus further comprises anti-surfacing members for preventing the substrate from rising up to a surface of the treating liquid stored in the treating tank. The anti-surfacing members, preferably, have a truncated cone shape with a vertically extending axis and an outer diameter gradually enlarging upward, and are arranged in the positions for contacting the edges of the substrate raised to the position above the transport rollers by the treating liquid discharge device. This can prevent the substrate from rising to the surface of the treating liquid regardless of the width dimension of the substrate, i.e., the distance between the pair of edges extending along the transport direction of the substrate.

In another preferred embodiment, each of the transport rollers has a pair of contact portions for contacting only a pair of edges extending in a transport direction of the substrate transported by the transport rollers. Such substrate treating apparatus prevents contact between portions other than the edges of the substrate and the transport rollers, thereby to prevent unevenness of treatment occurring on the back surface of the substrate, and treat both front and back surfaces of the substrate uniformly.

In another aspect of this invention, there is provided a substrate treating method for immersing and treating a rectangular substrate in a treating liquid. This method comprises a treating liquid supplying step for supplying the treating liquid to a treating tank to store the treating liquid in the treating tank; a substrate loading step for transporting the substrate with transport rollers into the treating tank having the treating liquid stored therein; a treating liquid discharging step for discharging the treating liquid from below the substrate to raise the substrate to a position above the transport rollers and below a surface of the treating liquid; a substrate lowering step for stopping discharge of the treating liquid and lowering the substrate to a position for contacting the transport rollers; and a substrate unloading step for transporting the substrate with the transport rollers out of the treating tank.

Other features and advantages of the invention will be apparent from the following detailed description of the preferred embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DETAILED DESCRIPTION OF THE PREFERRED

Embodiments

Figure 1:
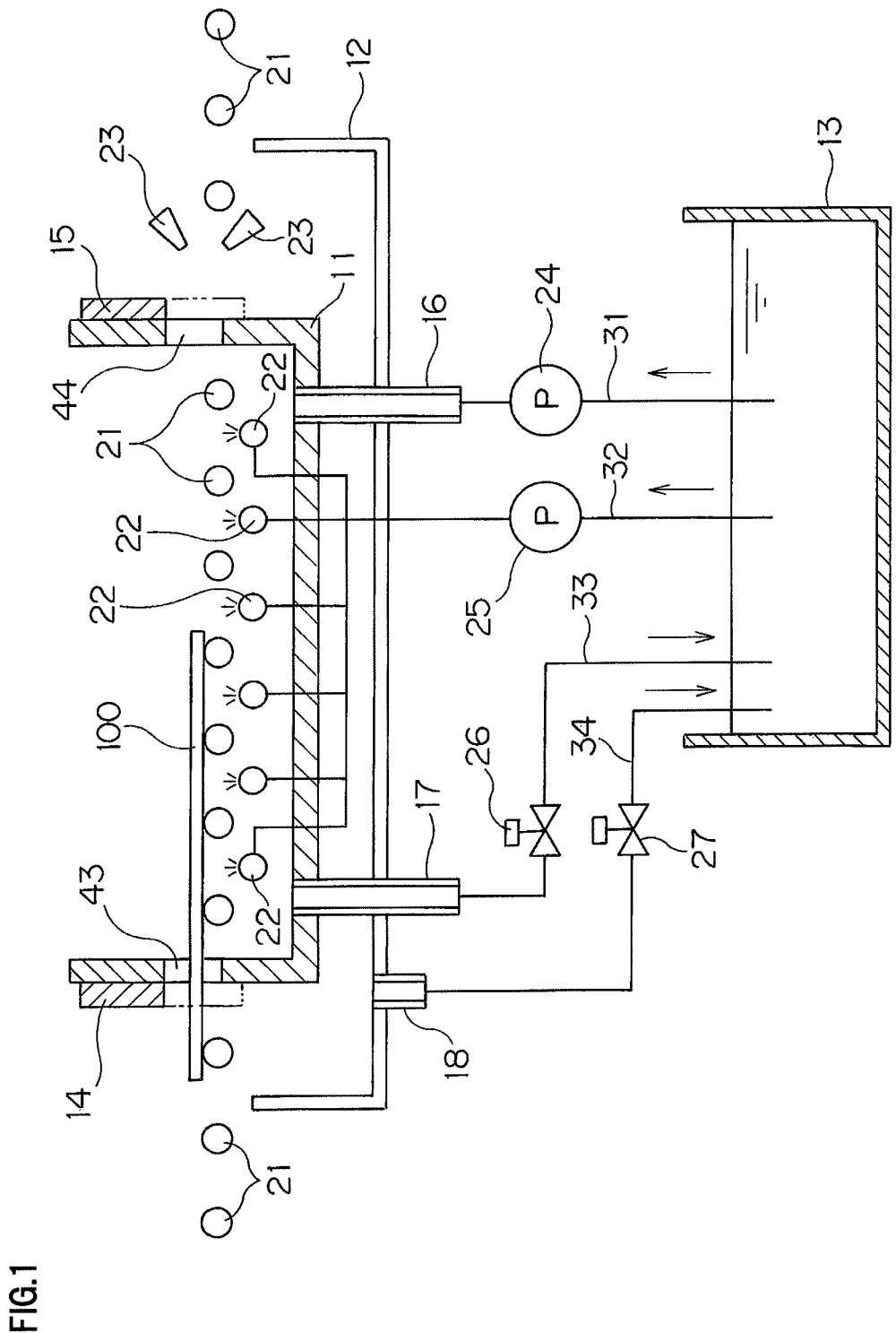
FIG. 1 is a schematic side view of a substrate treating apparatus according to a preferred embodiment of this invention.
Figure 2:
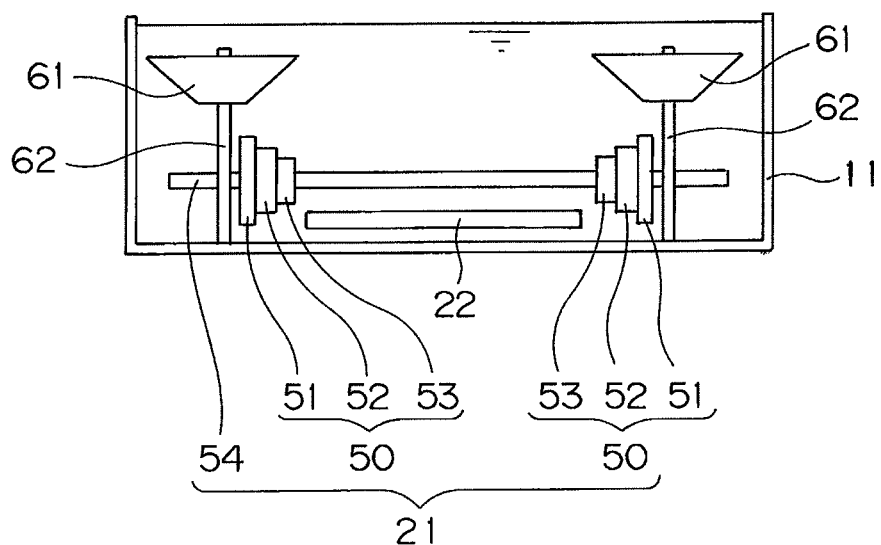
FIG. 2 is a schematic front view showing a principal portion of the substrate treating apparatus according to the embodiment of this invention.
Figure 3:
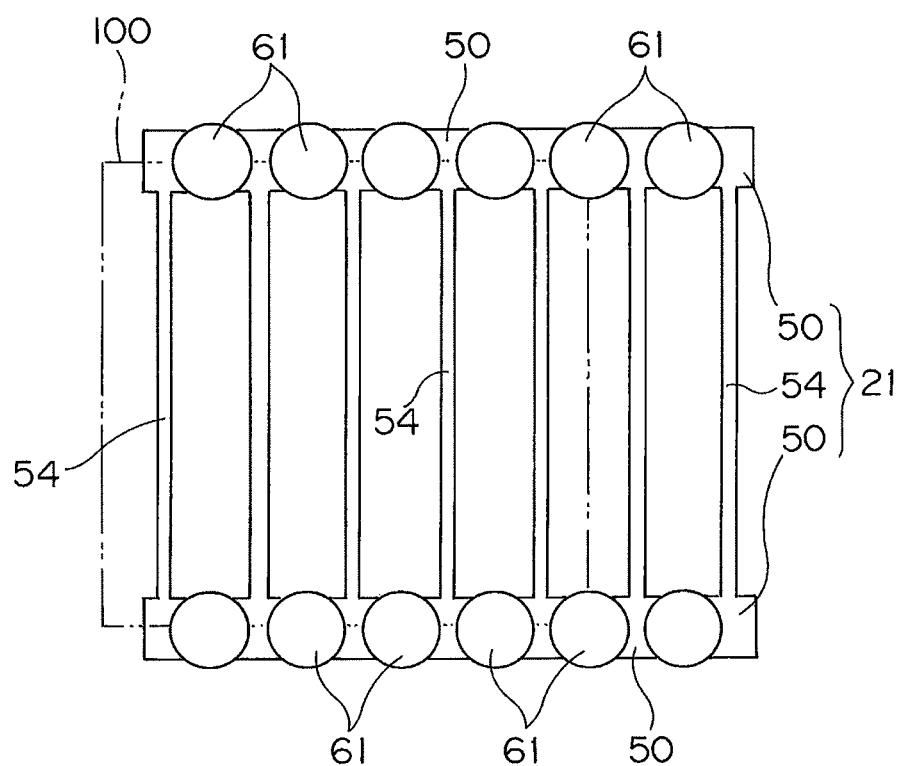
FIG. 3 is a plan view showing an arrangement relation between anti-surfacing members and transport rollers.

Preferred embodiments of this invention will be described hereinafter with reference to the drawings. FIG. 1 is a schematic side view of a substrate treating apparatus according to this invention. FIG. 2 is a schematic front view showing a principal portion thereof. FIG. 3 is a plan view showing an arrangement relation between anti-surfacing members 61 and transport rollers 21. The anti-surfacing members 61 and other components are omitted from FIG. 1.

This substrate treating apparatus is designed for etching treatment of a glass substrate 100 with an etchant, and has a plurality of transport rollers 21 for supporting the glass substrate 100 at the back surface thereof. The substrate treating apparatus includes a treating tank 11 for treating the glass substrate 100, a collecting tank 12 for collecting the treating liquid, and a storage tank 13 for storing the treating liquid. The substrate treating apparatus further includes a plurality of spray nozzles 22 acting as an etchant discharge device for discharging the etchant toward the glass substrate 100 from below the transport rollers 21.

The treating tank 11 has an inlet port 43 and an outlet port 44 formed therein for loading and unloading the glass substrate 100, a shutter 14 for opening and closing the inlet port 43, and a shutter 15 for opening and closing the outlet port 44. The treating tank 11 has an etchant supply pipe 16 and an etchant drain pipe 17 attached to a lower surface thereof. The supply pipe 16 is connected to the storage tank 13 through a pipeline 31 and a pump 24 mounted thereon. The drain pipe 17 is connected to the storage tank 13 through a pipeline 33 and a switch valve 26 mounted thereon. Further, each spray nozzle 22 is connected to the storage tank 13 through a pipeline 32 and a flow variable pump 25 mounted thereon.

This flow variable pump 25 has a flow control circuit including an inverter, for example. By adjusting a flow rate of the etchant discharged from each spray nozzle 22, the flow variable pump 25 serves to raise the glass substrate 100 to a position above the transport rollers 21. An ordinary pump may be used instead of the flow variable pump 25, with a flow control valve disposed between this ordinary pump and each spray nozzle 22, thereby to adjust a flow rate of the etchant discharged from each spray nozzle 22.

The collecting tank 12 serves to collect the etchant flowing down from the treating tank 11, for example. The collecting tank 12 has an etchant collecting pipe 18 attached to a lower surface thereof. The collecting pipe 18 is connected to the storage tank 13 through a pipeline 34 and a switch valve 27 mounted thereon. A pair of air knives 23 are arranged in a position opposed to the outlet port 44 of the treating tank 11 and above the collecting tank 12 for removing the etchant adhering to the glass substrate 100.

As shown in FIG. 2, each transport roller 21 includes a pair of contact portions 50 for contacting only a pair of edges extending along a transport direction of the glass substrate 100, and a connecting rod 54 connecting these contact portions 50. Each contact portion 50 has three disk-shaped roll-like elements 51, 52 and 53 arranged coaxially about an axis extending horizontally and perpendicular to the transport direction of the glass substrate 100. These roll-like elements 51, 52 and 53 have different diameters, such that the element 53 closest to the center of the glass substrate 100 has the smallest diameter and the outermost element 51 has the largest diameter. For the sake of convenience of understanding, FIG. 2 shows the roll-like elements 51, 52 and 53 as having larger outside diameters than life-size.

As shown in FIGS. 2 and 3, anti-surfacing members 61 are arranged in positions between the plurality of transport rollers 21 in the etchant stored in the treating tank 11, for preventing the glass substrate 100 from rising or floating to the surface of the etchant stored in the treating tank 11 when the glass substrate 100 is raised above the transport rollers 21 for treatment. The anti-surfacing members 61 have a truncated cone shape with a vertically extending axis and an outer diameter gradually enlarging upward. The anti-surfacing members 61 are supported to be rotatable relative to support shafts 62 extending vertically. The anti-surfacing members 61 are spaced at regular intervals in positions for contacting the opposite edges of the glass substrate 100 having been moved above the transport rollers 21 by action of the etchant discharged from each spray nozzle 22 as described hereinafter. The conical surfaces (side surfaces) of the anti-surfacing members 61 having the truncated cone shape are inclined relative to the principal surface of the glass substrate 100.

Figure 4:
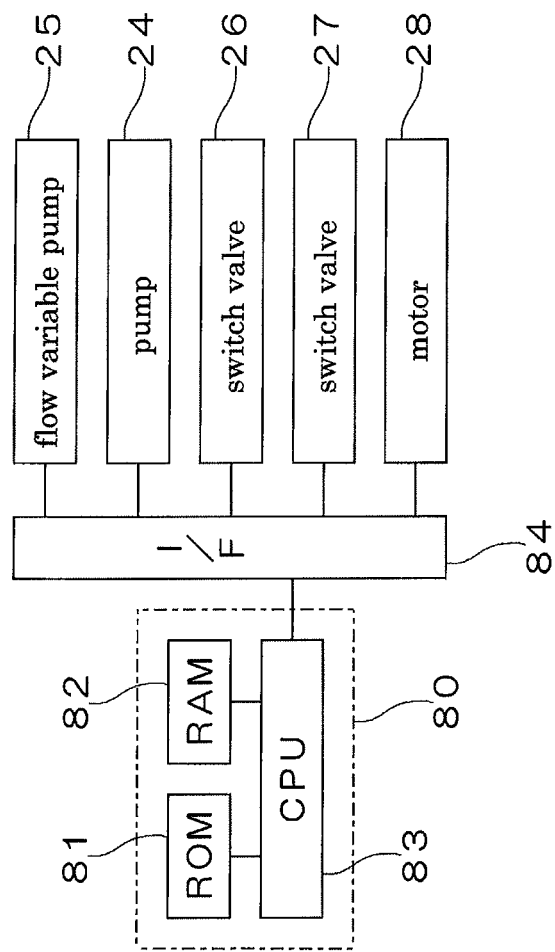
FIG. 4 is a block diagram showing a main control system of the substrate treating apparatus according to the embodiment of this invention.

FIG. 4 is a block diagram showing a main control system of the substrate treating apparatus according to this invention.

This substrate treating apparatus has a controller 80 which controls the entire apparatus. The controller 80 includes a ROM 81 for storing operating programs necessary for controlling the apparatus, a RAM 82 for temporarily storing data and the like during a control operation, and a CPU 83 for performing logic operations. The controller 80 is connected through an interface 84 to the flow variable pump 25, pump 24 and switch valves 26 and 27 shown in FIG. 1. The controller 80 is connected, through the interface 84, also to a motor 28 for rotating the transport rollers 21.

The pump 24, switch valve 26 and controller 80 act as a liquid level adjusting mechanism according to this invention, which varies the level of the etchant in the treating tank 11 between a position above the front surface of the glass substrate 100 transported by the transport rollers 21 and a position below the back surface of the glass substrate 100 transported by the transport rollers 21. The flow variable pump 25 and controller 80 act as a treating liquid discharge device according to this invention, which discharges the etchant from below the transport rollers 21, with the glass substrate 100 immersed in the treating liquid stored in the treating tank 11, thereby to raise the glass substrate 100 to the position above the transport rollers 21.

Figure 6:
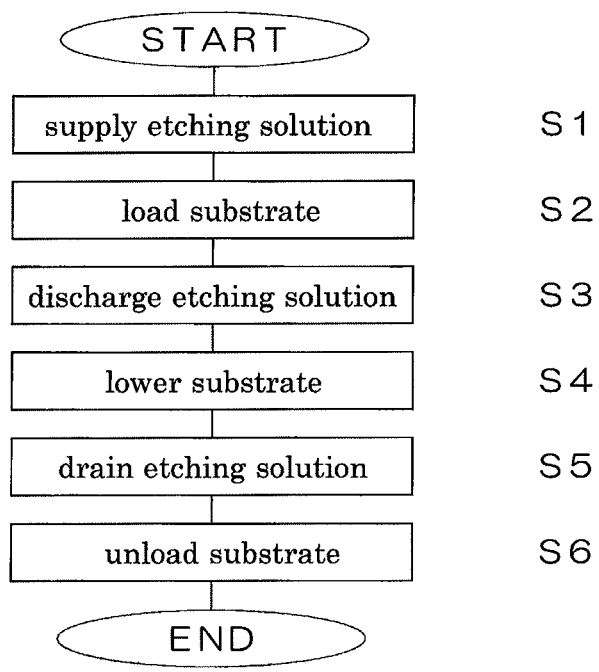
FIG. 6 is a flow chart showing the glass substrate etching process.
Figure 7:
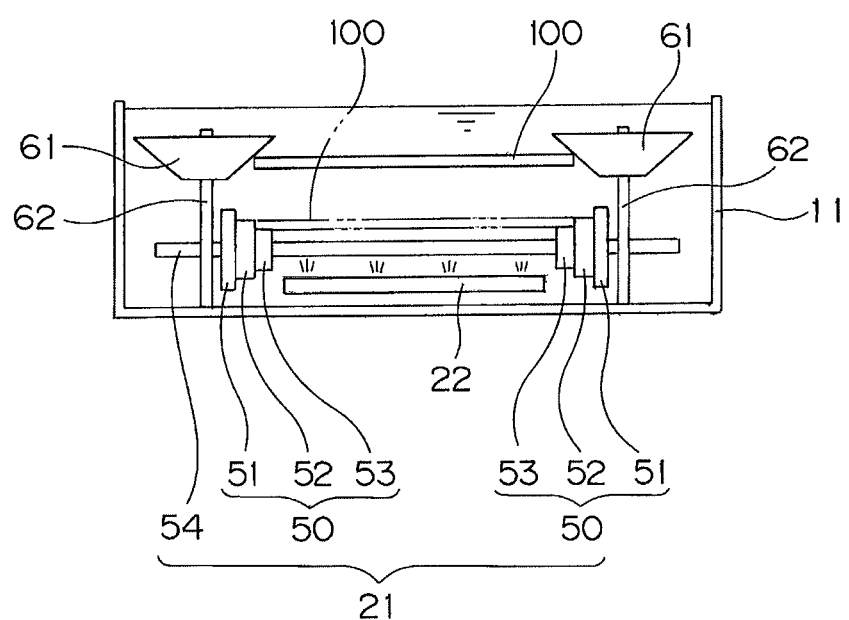
FIG. 7 is a schematic front view showing the principal portion of the substrate treating apparatus during the etching process.
Figure 8:
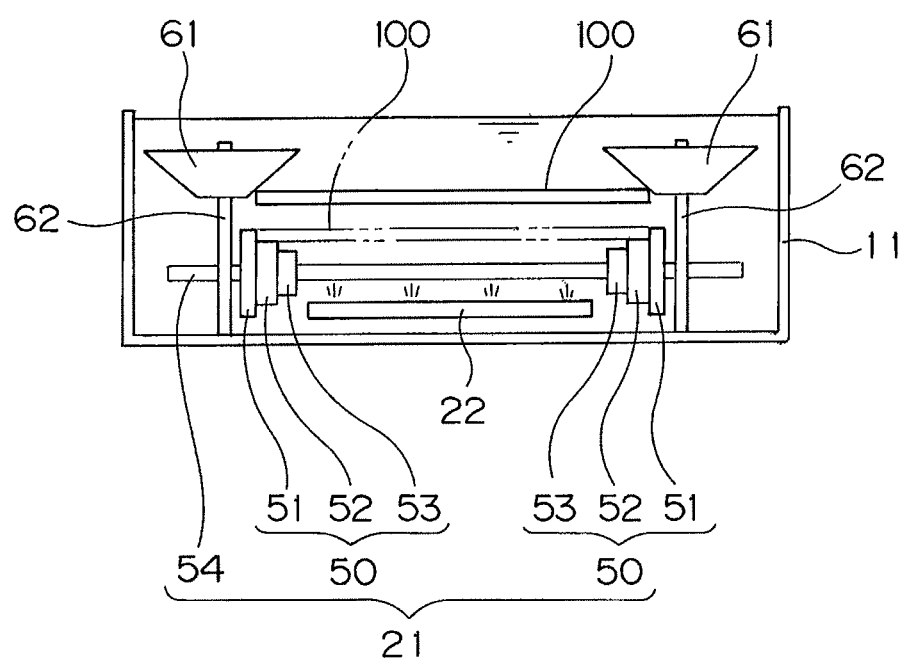
FIG. 8 is a schematic front view showing the principal portion of the substrate treating apparatus during the etching process.

Next, a process of treating the glass substrate 100 with the above substrate treating apparatus will be described. FIGS. 5A, 5B, 5C and 5D are explanatory views showing a process of etching the glass substrate 100 with the substrate treating apparatus according to this invention. FIG. 6 is a flow chart showing the process of etching the glass substrate 100 with the substrate treating apparatus according to this invention. Further, FIGS. 7 and 8 are schematic front views showing the principal portion of the substrate treating apparatus during the etching process. FIG. 7 shows a case of treating a glass substrate 100 having a smaller distance (in width dimension of the glass substrate 100) between the pair of edges extending along the transport direction. FIG. 8 shows a case of treating a glass substrate 100 having a larger distance (in width dimension of the glass substrate 100) between the pair of edges extending along the transport direction.

When etching the glass substrate 100 with this substrate treating apparatus, the etchant is first supplied from the storage tank 13 to the treating tank 11 so as to be stored in the treating tank 11 (step Si). At this time, the switch valve 26 is closed, and the pump 24 is operated to feed the etchant in the storage tank 13 to the treating tank 11 through the pipeline 31 to make the level of the etchant above the upper surfaces of the transport rollers 21. During this etchant supplying step, the inlet port 43 is closed by the shutter 14, and the outlet port 44 by the shutter 15.

Figure 5A:
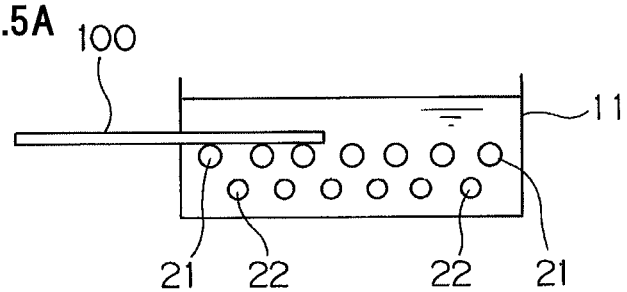
FIGS. 5A, 5B, 5C and 5D are explanatory views showing a glass substrate etching process with the substrate treating apparatus according to the embodiment of this invention.

In this state, as shown in FIGS. 1 and 5A, the glass substrate 100 is transported by the transport rollers 21 so as to be loaded into the treating tank 11 (step S2). At this time, the glass substrate 100 is transported as supported by the contact portions 50 of the transport rollers 21. These contact portions 50, having contacts with only the pair of edges extending along the transport direction of the glass substrate 100, rotate in accordance with a transportation velocity of the glass substrate 100.

Specifically, in the case of treating the glass substrate 100 having a smaller distance (in width dimension of the glass substrate 100) between the pair of edges extending along the transport direction, as shown in phantom in FIG. 7, the glass substrate 100 is transported with the pair of edges extending along the transport direction thereof supported by the roll-like elements 53 and guided by the roll-like elements 52. In the case of treating the glass substrate 100 having a larger distance (in width dimension of the glass substrate 100) between the pair of edges extending along the transport direction, as shown in phantom in FIG. 8, the glass substrate 100 is transported with the pair of edges extending along the transport direction thereof supported by the roll-like elements 52 and guided by the roll-like elements 51.

During this substrate loading step, the shutter 14 of the inlet port 43 is opened. Therefore, the etchant in the treating tank 11 flows from the inlet port 43 downwardly to the collecting tank 12 so as to be collected in the storage tank 13 through the pipeline 34. In this case also, the level of the etchant in the treating tank 11 can be maintained constant with the pump 24 feeding the etchant at a constant feed rate or higher.

Figure 5B:
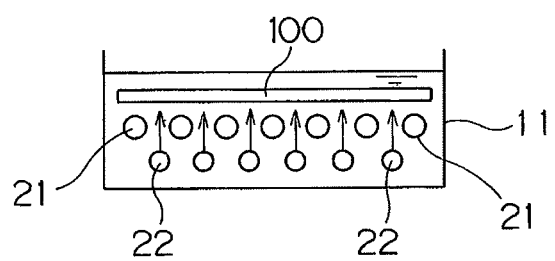

When the glass substrate 100 has completely entered the treating tank 11, the inlet port 43 is closed by the shutter 14. Then, the flow variable pump 25 is operated to discharge the etchant from the spray nozzles 22, whereby, as shown in FIG. 5B, the glass substrate 100 is raised to a position above the transport rollers 21 and below the surface of the etchant stored in the treating tank 11 (step S3). While this state is maintained for a fixed period of time, the process of etching the glass substrate 100 is performed. In this case, since the back surface of the glass substrate 100 is spaced from the transport rollers 21, etching unevenness on the back surface of the glass substrate 100 is prevented to accomplish uniform treatment of the glass substrate 100.

In this etching process, the glass substrate 100 is raised to the position above the transport rollers 21 by operating the flow variable pump 25 to control the flow rate of the etchant discharged from the spray nozzles 22. When the glass substrate 100 rises to a large extent above the transport rollers 21 in this etching process, as shown in solid lines in FIGS. 7 and 8, the opposite edges of the glass substrate 100 make contact with the conical surfaces (side surfaces) of the anti-surfacing members 61 having the truncated cone shape. This effectively prevents the glass substrate 100 from rising up to the surface of the etchant stored in the treating tank 11.

Furthermore, since the anti-surfacing members 61 have a truncated cone shape with a vertically extending axis and an outer diameter gradually enlarging upward, as shown in FIGS. 7 and 8, the ascent of this glass substrate 100 can be prevented effectively regardless of the distance (in width dimension of the glass substrate 100) between the pair of edges extending along the transport direction of the glass substrate 100.

Figure 5C:
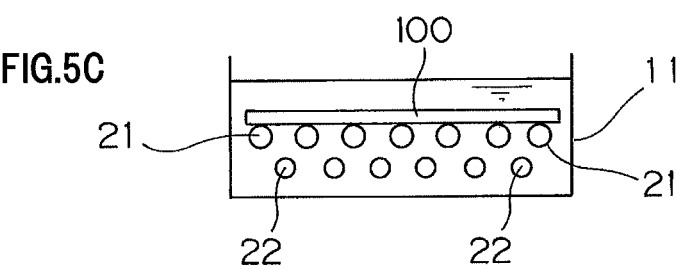

When the glass substrate 100 has fully been etched, the discharge of the etchant from the spray nozzles 22 is stopped, and as shown in FIG. 5C, the glass substrate 100 is lowered to the position to make contact with the transport rollers 21 (step S4). As a result of this lowering step, the glass substrate 100 is supported by the transport rollers 21.

Next, the etchant is drained from the treating tank 11 (step S5). In this etchant draining step, the pump 24 is stopped and the switch valve 26 is opened, whereby the etchant in the treating tank 11 is collected in the storage tank 13 through the pipeline 33. In this etchant draining step, the shutter 14 of the inlet port 43 and the shutter 15 of the outlet port 44 are opened to drain the etchant from the treating tank 11 also through these inlet port 43 and outlet port 44. The etchant flowing out of the inlet port 43 and outlet port 44 is received by the collecting tank 12 so as to be collected in the storage tank 13 through the pipeline 34 and switch valve 27.

Figure 5D:
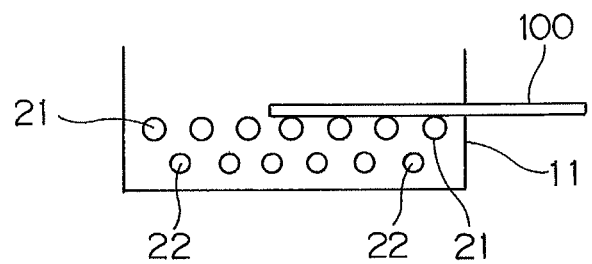

When the draining of the etchant from the treating tank 11 is completed, as shown in FIG. 5D, the glass substrate 100 is transported by the transport rollers 21 out of the treating tank 11 (step S6). Concurrently therewith, the glass substrate 100 having a smaller distance (in width dimension of the glass substrate 100) between the pair of edges extending along the transport direction, as shown in phantom in FIG. 7, is transported with the pair of edges extending along the transport direction thereof supported by the roll-like elements 53 and guided by the roll-like elements 52, on the one hand. On the other hand, concurrently therewith, the glass substrate 100 having a larger distance (in width dimension) between the pair of edges extending along the transport direction, as shown in phantom in FIG. 8, is transported with the pair of edges extending along the transport direction thereof supported by the roll-like elements 52 and guided by the roll-like elements 51.

Both of the front and back surfaces of the glass substrate 100 having passed the outlet port 44 of the treating tank 11 are subjected to compressed air blown off from the air knives 23. Consequently, the etchant adhering to both of the front and back surfaces of the glass substrate 100 is removed, which drips to the collecting tank 12. In this substrate unloading step, the etchant as the treating liquid is not allowed to remain in the treating tank 11, and the etchant adhering to the glass substrate 100 is removed by the pair of air knives 23. This enables a reduction in the amount of etchant carried over to a subsequent treating process.

Figure 9:
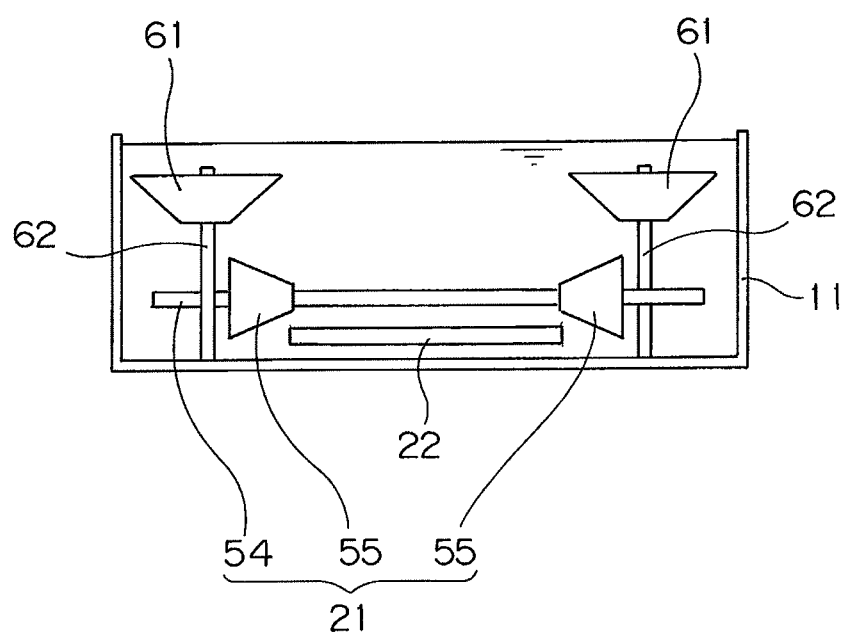
FIG. 9 is a schematic front view showing a principal portion of a substrate treating apparatus according to a second preferred embodiment of this invention.
Figure 10:
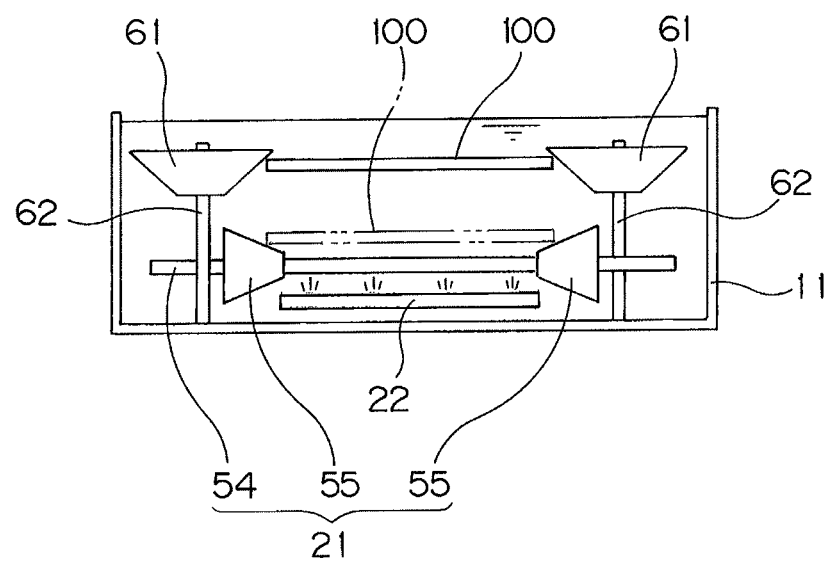
FIG. 10 is a schematic front view showing the principal portion of the substrate treating apparatus during an etching process.
Figure 11:
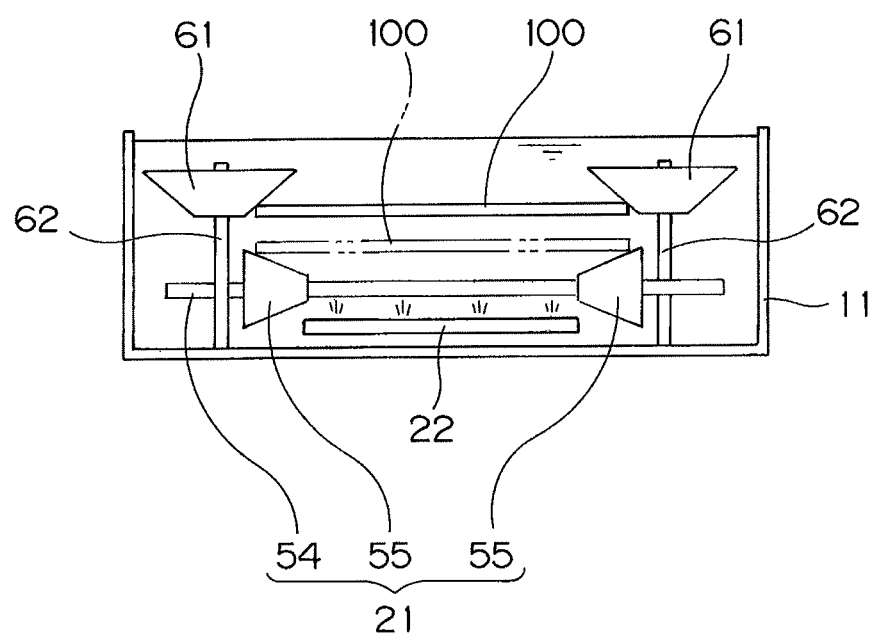
FIG. 11 is a schematic front view showing the principal portion of the substrate treating apparatus during the etching process.

Another preferred embodiment of this invention will be described next. FIG. 9 is a schematic front view showing a principal portion of a substrate treating apparatus according to a second preferred embodiment of this invention. FIGS. 10 and 11 are schematic front views showing the principal portion of the substrate treating apparatus during an etching process. FIG. 10 shows a case of treating a glass substrate 100 having a smaller distance (in width dimension of the glass substrate 100) between the pair of edges extending along the transport direction. FIG. 11 shows a case of treating a glass substrate 100 having a larger distance (in width dimension of the glass substrate 100) between the pair of edges extending along the transport direction.

Each transport roller 21 according to this second embodiment includes a pair of contact portions 55 and a connecting rod 54. That is, in the first embodiment described above, as shown in FIGS. 2, 7 and 8, each contact portion 50 of the transport rollers 21 employed has three disk-shaped roll-like elements 51, 52 and 53 arranged coaxially. On the other hand, this second embodiment, as shown in FIGS. 9 through 11, employs contact portions 55 arranged at opposite ends of the connecting rod 54 extending horizontally and perpendicular to the transport direction of the glass substrate 100, each contact portion 55 having a truncated cone shape with a smaller diameter at an end thereof close to the center of the glass substrate 100 and a larger diameter at the other end which is close to an edge of the glass substrate 100. For the sake of convenience of understanding, FIGS. 9 through 11 also show the contact portions 55 as having larger outer diameters than life-size.

The transport rollers 21 according to this second embodiment, as shown in phantom in FIGS. 10 and 11, the glass substrate 100 can be transported as maintained in a predetermined position (i.e., with the central position between the pair of edges extending along the transport direction of the glass substrate 100 being maintained constant) regardless of types or kinds in the distance (in width dimension of the glass substrate 100) between the pair of edges extending along the transport direction of the glass substrate 100.

Figure 12:
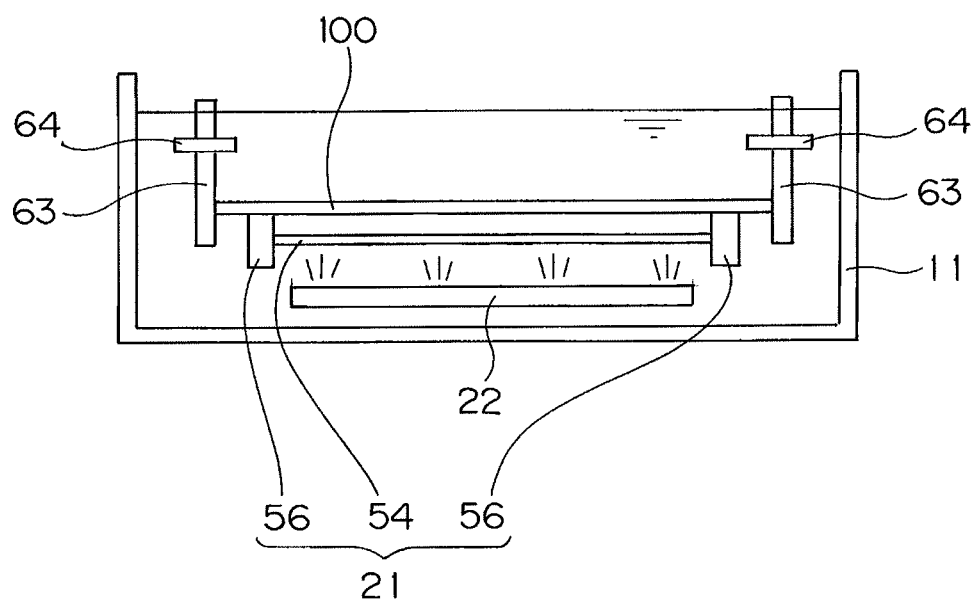
FIG. 12 is a schematic front view showing a principal portion of a substrate treating apparatus according to a third preferred embodiment of this invention.

A further preferred embodiment of this invention will be described next. FIG. 12 is a schematic front view showing a principal portion of a substrate treating apparatus according to a third preferred embodiment of this invention.

In the substrate treating apparatus according to this third embodiment, each transport roller 21 has a pair of roll-like elements 56 and a connecting rod 54 connecting these roll-like elements 56. The pair of roll-like elements 56 are arranged oppositely in the direction perpendicular to the transport direction of the glass substrate 100.

As shown in FIG. 12, guide rollers 63 rotatable about vertical axes are arranged in opposite end regions in the direction perpendicular to the transport direction of the glass substrate 100 transported by the transport rollers 21. These guide rollers 63 are arranged in pairs along the edges of the glass substrate 100. The guide rollers 63 are driven by a motor, not shown, to rotate synchronously with a transportation velocity of the glass substrate 100 transported by the transport rollers 21. In the etchant discharging step described hereinbefore, the guide rollers 63 act as guide members for guiding the opposite ends in the direction perpendicular to the transport direction of the glass substrate 100 when the glass substrate 100 rises to the position above the transport rollers 21.

The distance between the guide rollers 63 is in agreement with the distance (in width dimension of the glass substrate 100) between the pair of edges extending along the transport direction of the glass substrate 100. That is, this embodiment is premised on treatment of glass substrates 100 of fixed size with the same distance (in width dimension of the glass substrate 100) between the pair of edges extending along the transport direction of the glass substrates 100.

The guide rollers 63 have flanges 64 arranged on portions thereof above upper ends of the the transport rollers 21 (precisely, the roll-like members 56) and below the surface of the etchant stored in the treating tank 11. These flanges 64 act as anti-surfacing members for preventing the glass substrate 100 from rising up to the surface of the etchant stored in the treating tank 11.

Figure 13:
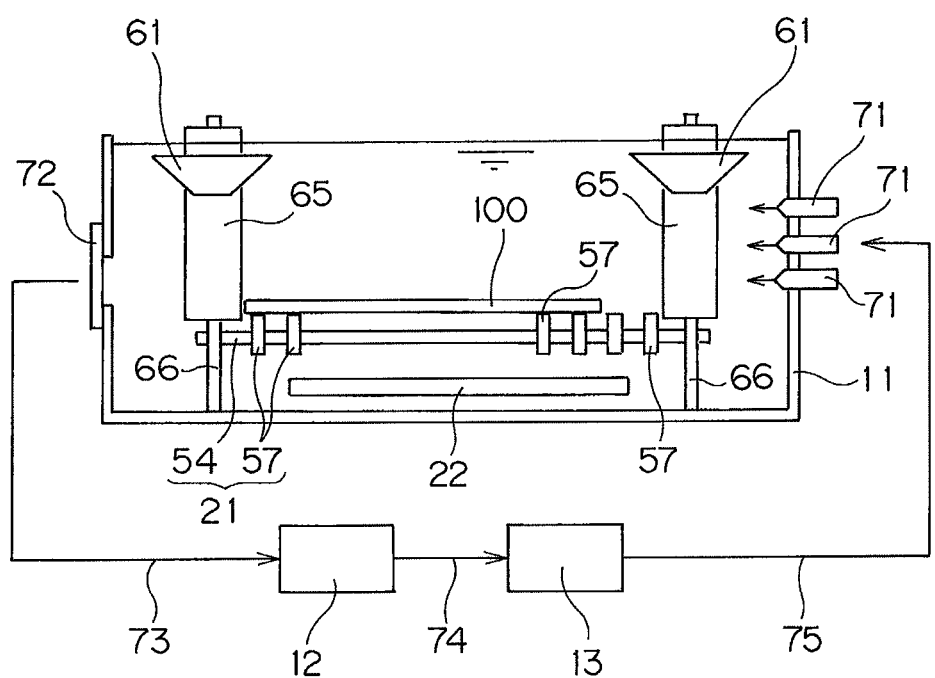
FIG. 13 is a schematic front view showing a principal portion of a substrate treating apparatus according to a fourth preferred embodiment of this invention.
Figure 14:
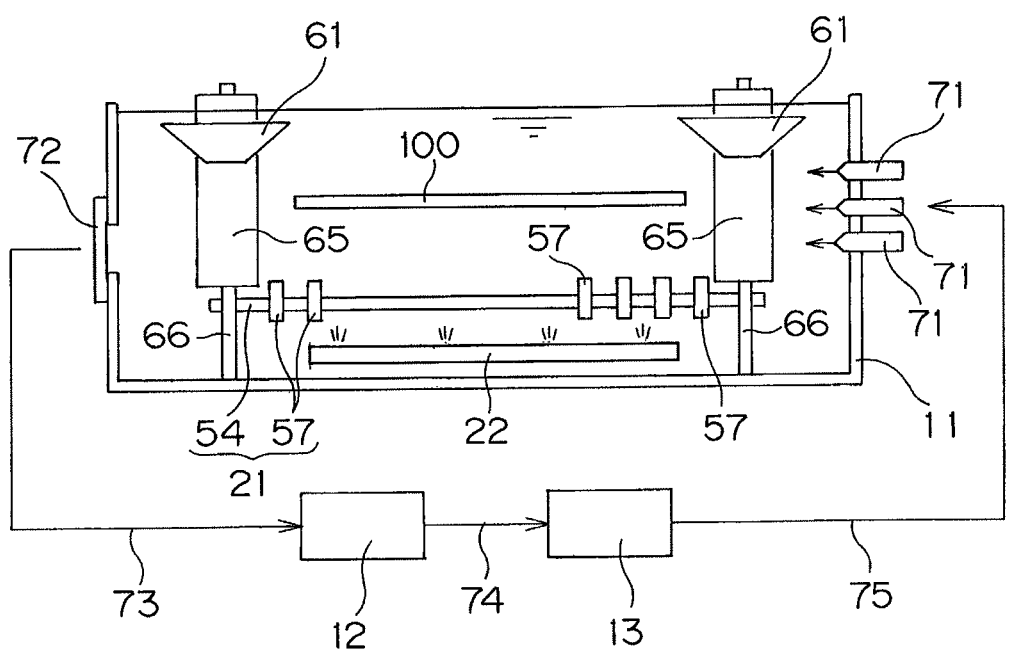
FIG. 14 is a schematic front view showing the principal portion of the substrate treating apparatus according to the fourth embodiment of this invention.
Figure 15:
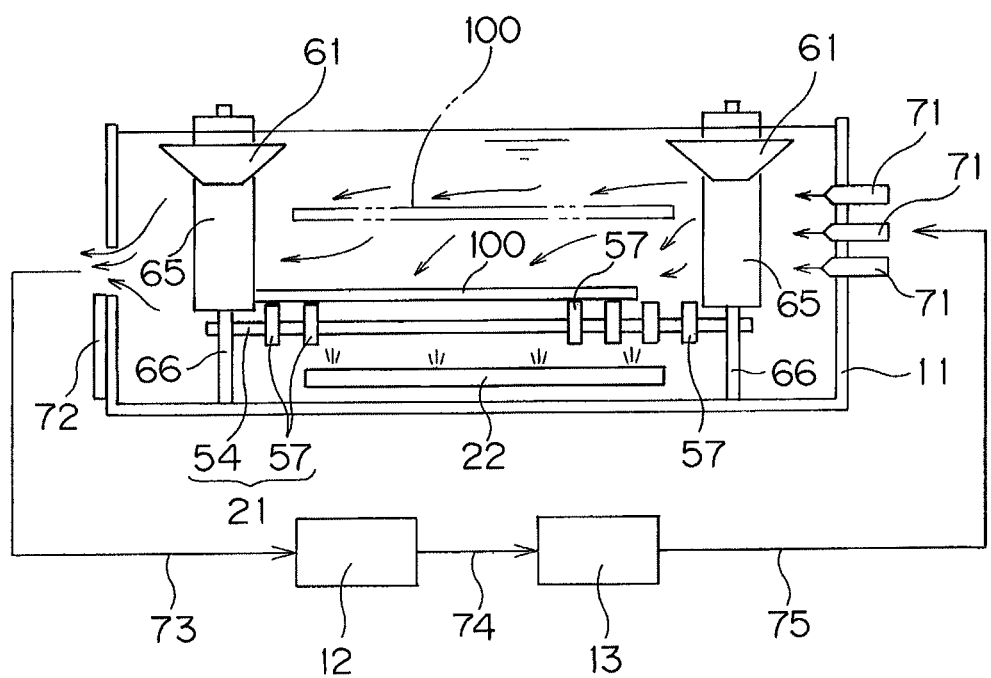
FIG. 15 is a schematic front view showing the principal portion of the substrate treating apparatus according to the fourth embodiment of this invention.

A still further preferred embodiment of this invention will be described next. FIGS. 13 through 15 are schematic front views showing a principal portion of a substrate treating apparatus according to a fourth preferred embodiment of this invention.

In the substrate treating apparatus according to this fourth embodiment, each transport roller 21 has a plurality of roll-like elements 57 and a connecting rod 54 connecting these roll-like elements 57. The substrate treating apparatus according to the fourth embodiment includes guide rollers 65 arranged in positions spaced apart from each other by a larger distance than the distance (in width dimension of the glass substrate 100) between the pair of edges extending in the transport direction of the glass substrate 100 transported by the transport rollers 21. The guide rollers 65 can have contact with the edges of the glass substrate 100, and are rotatable about vertical axes 66. Further, anti-surfacing members 61 similar to those in the first and second embodiments are arranged between these guide rollers 65.

The substrate treating apparatus according to the fourth embodiment includes a plurality of spray nozzles 71 for squirting the etchant in the direction perpendicular to the transport direction of the glass substrate 100 transported by the transport rollers 21. When the glass substrate 100 rises to a position above the transport rollers 21, the etchant so squirted will move the glass substrate 100 in a direction to place one of the edges thereof in contact with the guide rollers 65. The treating tank 11 has a shutter 72 for opening and closing an opening formed in a position opposed to the spray nozzles 71.

The spray nozzles 71 receive the etchant supplied from the storage tank 13 shown in FIG. 1. When the shutter 72 is opened, the etchant in the treating tank 11 is sent to the storage tank 13 after flowing down to the collecting tank 12 shown in FIG. 1. The direction of flow of the etchant from the spray nozzles 71 toward the shutter 72 is perpendicular to the transport direction of the glass substrate 100 from the inlet port 43 to the outlet port 44 shown in FIG. 1.

When an etching process is carried out with the substrate treating apparatus according to the fourth embodiment, as in the first embodiment, the glass substrate 100 is transported by the transport rollers 21 so as to be loaded into the treating tank 11 as shown in FIG. 5A. Specifically, as shown in FIG. 13, the glass substrate 100 is transported as supported by the roll-like elements 57 of the transport rollers 21. One edge of the glass substrate 100 is in contact with the guide rollers 65 during the transport, and therefore, the glass substrate 100 is transported as guided by these guide rollers 65.

When the glass substrate 100 has completely entered the treating tank 11, the inlet port 43 is closed by the shutter 14 as in the first embodiment. Then, the flow variable pump 25 is operated to discharge the etchant from the spray nozzles 22, whereby, as shown in FIG. 5B, the glass substrate 100 is raised to the position above the transport rollers 21 and below the surface of the etchant stored in the treating tank 11. Namely, as shown in FIG. 14, the glass substrate 100 floats in a position between the guide rollers 65 forming pairs. By maintaining this state for a fixed period of time, the process of etching the glass substrate 100 is performed.

When the glass substrate 100 has fully been etched, the discharge of the etchant from the spray nozzles 22 is stopped, and as shown in FIG. 5C, the glass substrate 100 is lowered to the position to make contact with the transport rollers 21. Concurrently therewith, as shown in FIG. 15, the shutter 72 is opened and the etchant is squirted from the spray nozzles 71. Consequently, the glass substrate 100 moves toward the shutter 72, and when the glass substrate 100 is supported by the transport rollers 21, as shown in solid lines in FIG. 15, one edge of the glass substrate 100 has contact with the guide rollers 65.

Subsequently, the pump 24 is stopped and the switch valve 26 is opened, whereby the etchant in the treating tank 11 is collected in the storage tank 13 through the pipeline 33. Incidentally, the squirt of the etchant from the spray nozzles 71 may be continued during collecting the etchant. Subsequently, the glass substrate 100 is transported as supported by the transport rollers 21, while, as shown in FIG. 13, the one edge of the glass substrate 100 being in contact with the guide rollers 65, so that the glass substrate 100 is transported as guided by these guide rollers 65.

In the substrate treating apparatus according to the fourth embodiment, as described above, the glass substrate 100 can be transported as maintained in a predetermined position (i.e., with the one edge of the glass substrate 100 extending along the transport direction thereof being maintained constant) regardless of types or kinds in the distance (in width dimension of the glass substrate 100) between the pair of edges extending along the transport direction of the glass substrate 100.

The first, second and fourth embodiments described hereinbefore use a plurality of anti-surfacing members 61 to prevent the glass substrate 100 from rising up to the surface of the etchant stored in the treating tank 11. The anti-surfacing members 61 have a truncated cone shape with a vertically extending axis and an outer diameter gradually enlarging upward. However, anti-surfacing members having a different configuration may be used as long as they are arranged in positions for contacting the pair of edges extending in the transport direction of the glass substrate 100 and have surfaces inclined relative to the principal surface of the glass substrate 100 when the glass substrate 100 rises to a position above the transport rollers 21. Such anti-surfacing members may be elongated members having surfaces inclined relative to the principal surface of the glass substrate 100 and extending in the transport direction of the glass substrate 100.

In the embodiments described hereinbefore, this invention is applied to the substrate treating apparatus and substrate treating method for etching the glass substrate 100. It is also possible to apply this invention to substrate treating apparatus and substrate treating methods for carrying out various other types of treatment such as cleaning, developing, and stripping. Further, this invention is applicable to substrate treating apparatus and substrate treating methods for carrying out these various types of treatment on other types of substrates such as printed circuit boards, for example.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2011-098886 filed in the Japanese Patent Office on Apr. 27, 2011 and Japanese Patent Application No. 2012-026836 filed in the Japanese Patent Office on Feb. 10, 2012, the entire disclosure of which is incorporated herein by reference.

What is claimed is:

1. A substrate treating apparatus for immersing and treating a rectangular substrate in a treating liquid, comprising:
   a treating tank for treating the substrate; transport rollers arranged in the treating tank for horizontally transporting the substrate;
   a supplying device for supplying a treating liquid into the treating tank from a storage tank storing the treating liquid;
   a draining device for draining the treating liquid from the treating tank to the storage tank;
   a liquid level adjusting mechanism for setting a level of the treating liquid in the treating tank at a position above the transport rollers;
   a treating liquid discharge device for discharging the treating liquid from below the transport rollers, with the substrate immersed in the treating liquid stored in the treating tank, thereby to raise the substrate to a position spaced above the transport rollers; and
   anti-surfacing members for preventing the substrate from rising up to said level of the treating liquid stored in the treating tank,
   wherein the anti-surfacing members have inclined surfaces facing downward toward said transport rollers, said inclined surfaces being arranged in positions for contacting a pair of edges of the substrate to block said substrate from rising upward toward said level of the treating liquid.

2. The substrate treating apparatus according to claim 1, wherein the anti-surfacing members have a truncated cone shape with a vertically extending axis and an outer diameter gradually enlarging upward, and are arranged in the positions for contacting the edges of the substrate raised to the position above the transport rollers by the treating liquid discharge device.

3. The substrate treating apparatus according to claim 1, wherein each of the transport rollers has a pair of contact portions for contacting only a pair of edges of the substrate extending in a transport direction of the substrate transported by the transport rollers, and so rotates on a horizontal axis as to transport the substrate horizontally in a direction perpendicular to said horizontal axis.

4. The substrate treating apparatus according to claim 3, wherein each of the contact portions includes a plurality of roll-like elements arranged coaxially about an axis extending horizontally and perpendicular to the transport direction of the glass substrate transported by the transport rollers, the roll-like elements having diameters decreasing toward a center of the substrate, and increasing outward of the substrate.

5. The substrate treating apparatus according to claim 3, wherein the contact portions are arranged coaxially about an axis extending horizontally and perpendicular to the transport direction of the glass substrate transported by the transport rollers, each of the contact portions having a truncated cone shape with a smaller diameter at an end thereof close to a center of the glass substrate and a larger diameter at the other end outward of the substrate.

6. The substrate treating apparatus according to claim 1, further comprising a plurality of guide rollers rotatable about vertical axes and spaced apart from each other by a distance corresponding to a distance between a pair of edges extending in a transport direction of the substrate transported by the transport rollers.

7. The substrate treating apparatus according to claim 6, wherein the guide rollers are rotatable synchronously with a transportation velocity of the glass substrate.

8. The substrate treating apparatus according to claim 7, wherein each of the guide rollers has a flange disposed above upper ends of the transport rollers and below a surface of the treating liquid stored in the treating tank.

9. The substrate treating apparatus according to claim 1, further comprising a plurality of guide members spaced apart from each other by a distance larger than a distance between a pair of edges extending in a transport direction of the substrate transported by the transport rollers, for contacting the pair of edges; and treating liquid squirters for squirting the treating liquid in a direction perpendicular to the transport direction of the substrate transported by the transport rollers, whereby, when the substrate is raised to the position above the transport rollers by the treating liquid discharge device, the substrate is moved in a direction to place one of the edges thereof in contact with the guide members.

10. The substrate treating apparatus according to claim 1, wherein the treating liquid is an etchant for etching the substrate.

11. The substrate treating apparatus according to claim 1, wherein each of the transport rollers has a pair of contact portions arranged for contacting only a pair of edges of said rectangular substrate which are disposed on opposite sides of said rectangular substrate and which extend in a transport direction of the substrate transported by the transport rollers, and so rotates on a horizontal axis as to transport the substrate horizontally in a direction perpendicular to said horizontal axis.

* * * * *